US007262519B1

(12) United States Patent
Krämer et al.

(10) Patent No.: US 7,262,519 B1
(45) Date of Patent: Aug. 28, 2007

(54) ACTUATOR UNIT WITH AT LEAST TWO ACTUATORS AND A SECURE CONTROL UNIT

(75) Inventors: Werner Krämer, Schwandorf (DE); Martin Meinke, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 1075 days.

(21) Appl. No.: 10/110,109

(22) PCT Filed: Sep. 18, 2000

(86) PCT No.: PCT/DE00/03235

§ 371 (c)(1),
(2), (4) Date: Apr. 8, 2002

(87) PCT Pub. No.: WO01/27954

PCT Pub. Date: Apr. 19, 2001

(30) Foreign Application Priority Data

Oct. 8, 1999 (DE) ................................ 199 48 633

(51) Int. Cl.
*H02J 1/00* (2006.01)

(52) U.S. Cl. .......................................... 307/86; 361/66

(58) Field of Classification Search .................. 307/86, 307/126, 141.8; 361/66, 115
See application file for complete search history.

(56) References Cited

U.S. PATENT DOCUMENTS 3,354,415 A * 11/1967 Gribble et al. .............. 335/131
3,898,527 A 8/1975 Cawley ....................... 361/23
4,206,443 A * 6/1980 Britton ....................... 340/3.43
4,368,443 A * 1/1983 Koshman et al. ........... 335/138
4,782,244 A * 11/1988 Wakimoto .................. 307/116
5,466,974 A * 11/1995 Sutrina et al. ................ 307/38
5,654,593 A * 8/1997 Murata ......................... 307/86
5,689,398 A * 11/1997 Miller et al. ................ 361/189
5,777,834 A * 7/1998 Lehner et al. ................ 361/66
6,989,499 B2 * 1/2006 Bortolloni et al. ....... 200/50.05

FOREIGN PATENT DOCUMENTS

| | | |
|---|---|---|
| DE | 29 20 188 | 3/1980 |
| DE | 29 20 188 B1 | 3/1980 |
| DE | 295 08 611 U1 | 9/1995 |
| DE | 44 21 267 A1 | 1/1996 |
| DE | 197 51 674 A1 | 4/1999 |
| WO | WO96 42098 A | 12/1996 |

OTHER PUBLICATIONS

Relais-Schnittstelle—Multifunktionelle Einheit: Fassung, Relais plus Funktion, *Elektrotechnik*, 72, H. 4, Apr. 24, 1990.

* cited by examiner

*Primary Examiner*—Ronald W. Leja
(74) *Attorney, Agent, or Firm*—Harness, Dickey & Pierce

(57) ABSTRACT

In order to provide a bearing for an already prepositioned switching shaft, fitted with coupling levers, of a low-voltage circuit breaker in the region where the switching forces act, a bearing assembly is provided. The bearing assembly includes a bearing body which is mounted on the housing front wall of the switch pole, surrounding the switching shaft in the form of a half shell. The bearing body includes a subregion which projects between two coupling levers, which are at a distance from one another and are connected to a movable switching contact. It thus forms side guide surfaces for the coupling levers. Such a bearing assembly can be arranged in both the end regions of the switching shaft in multipole circuit breakers.

13 Claims, 2 Drawing Sheets

ACTUATOR UNIT WITH AT LEAST TWO ACTUATORS AND A SECURE CONTROL UNIT

This application is the national phase under 35 U.S.C. § 371 of PCT International Application No. PCT/DE00/03235 which has an International filing date of Sep. 18, 2000, which designated the United States of America, the entire contents of which are hereby incorporated by reference.

FIELD OF THE INVENTION

The present invention generally relates to an actuator unit having at least two contactors and a safe drive unit. Preferably, it may relate to one in which a three-phase circuit with a rated voltage of at least 380 V can be opened and closed by use of the contactors, and/or one in which the three-phase circuit is opened as soon as at least one of the contactors is deactivated. Further, it may relate to one in which the drive unit can be supplied by at least one safe disconnection channel with an emergency disconnection signal for the three-phase circuit, on the basis of which the drive unit opens the three-phase circuit by driving at least one of the contactors.

BACKGROUND OF THE INVENTION

An actuator unit is generally known and is used in safety-related three-phase circuits in order to ensure safe emergency disconnection of the three-phase circuit even if one of the contactors fails.

In the prior art, the drive unit is often arranged well away from the contactors. A large number of cables must therefore be laid between the contactors and the drive unit. In particular, at least two supply lines and at least one return signaling line must be laid for each contactor.

SUMMARY OF THE INVENTION

An object of an embodiment of the present invention can be to provide an actuator unit in which safe emergency disconnection of the three-phase circuit is ensured with as little wiring complexity as possible.

An object an embodiment of the invention can be achieved by contactors and the drive unit being combined to form an installation module which can be fitted and removed as a unit.

This is because both the supply lines and the return signaling lines can then hard-wired within the actuator unit. The three-phase circuit can also be permanently connected between the contactors in advance.

Where there are a number of actuator units that need to be disconnected in the event of an emergency, the wiring complexity can be reduced even further if the emergency disconnection signal can be passed on from the drive unit via a safe output channel to a further actuator unit.

If the drive unit can be supplied via an input channel with a drive signal for the three-phase circuit, on the basis of which the drive unit opens and closes the three-phase circuit depending on the drive signal if the emergency disconnection signal is not present, the actuator unit can also be used for opening and closing the three-phase circuit during normal operation.

The three-phase circuit can be opened in a particularly safe manner if the drive unit always deactivates all the contactors in order to open the three-phase circuit.

If the contactors and the drive unit are separated by encapsulation from a housing with a high degree of ingress protection, the actuator unit can also be used in an environment where water spray and dust occur. “High degree of ingress protection” in this case means protection at least to IP 54, preferably to IP 65 or even to IP 67.

If the actuator unit has plug connectors for connecting the contactors to the three-phase circuit, the external wiring of the actuator unit can be connected up particularly quickly. The plug connectors are preferably accessible from outside the housing. If the plug connectors have holding apparatuses for securing mating plug connectors which are connected to the plug connectors, the actuator unit operates particularly reliably.

BRIEF DESCRIPTION OF THE DRAWINGS

Further advantages and details can be found in the following description of an exemplary embodiment. In this case, illustrated in outline form, FIGS. 1 and 2 each show an actuator unit.

DETAILED DESCRIPTION OF THE PREFERRED EMBODIMENTS

Figure 1:
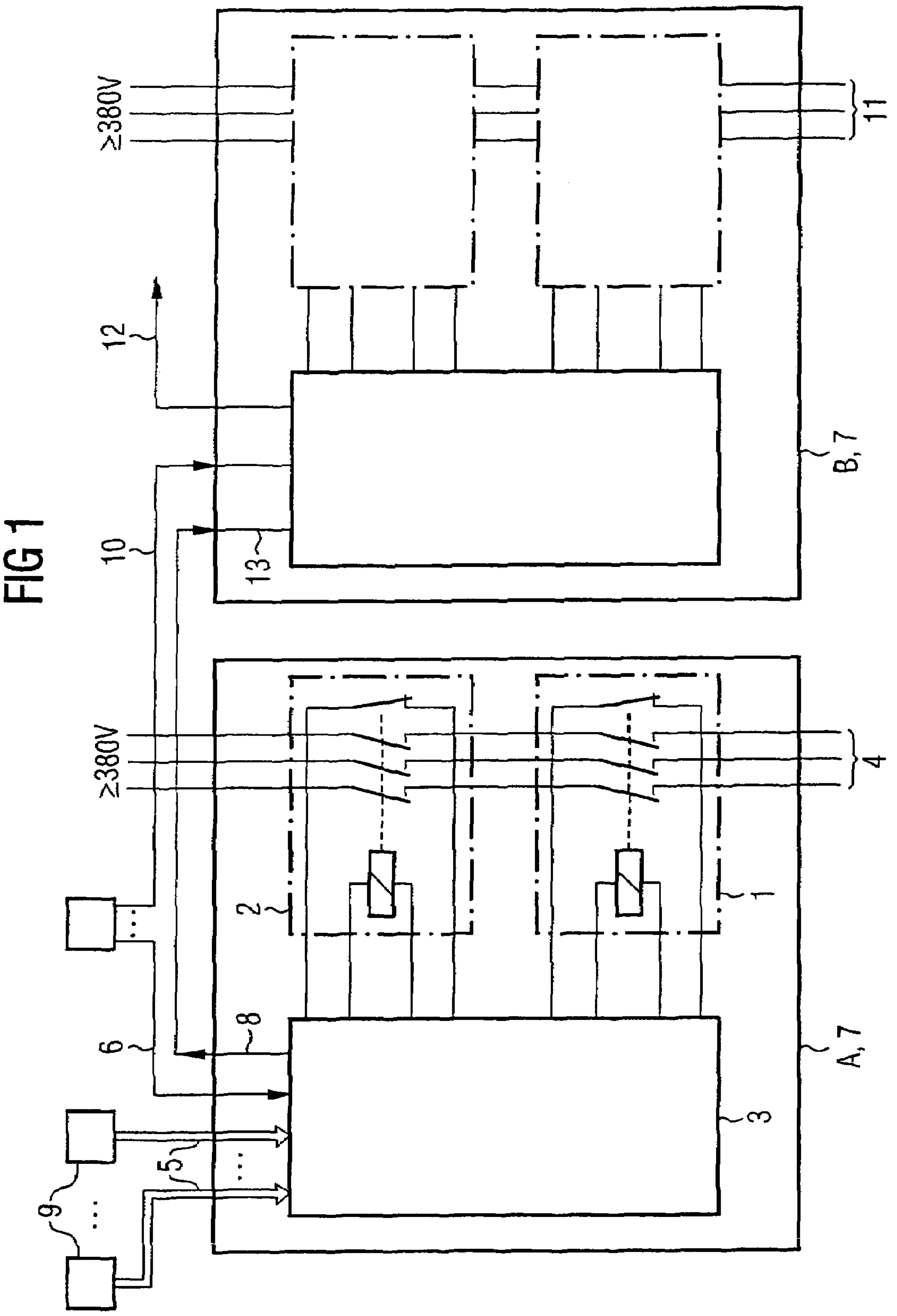

FIG. 1 shows an actuator unit A with two contactors 1, 2 and a fail-safe drive unit 3. A three-phase circuit 4 can be opened and closed by use of the contactors 1, 2. The contactors 1, 2 are designed such that the three-phase circuit 4 may have a rated voltage U of up to 1 kV. In particular, the rated voltage may thus be 380 V or more. The three-phase circuit 4 is opened as soon as at least one of the contactors 1, 2 is deactivated The actuator unit A has a number of safe disconnection channels 5. The drive unit 3 can be supplied with an emergency disconnection signal for the three-phase circuit 4 via any of the safe disconnection channels 5. As soon as an emergency disconnection signal is supplied via one of the safe disconnection channels 5 to the drive unit 3, the drive unit 3 drives both contactors 1, 2, and deactivates them. In consequence, both contactors 1, 2 open the three-phase circuit 4. The three-phase circuit 4 is thus safely opened even if one of the contactors 1, 2 fails.

The drive unit 3 furthermore has an input channel 6 via which the drive unit 3 can be supplied with a drive signal for the three-phase circuit 4. When the emergency disconnection signal is not present, the drive unit 3 is thus able to open or to close the three-phase circuit 4 depending on the drive signal.

FIG. 1 shows the contactors 1, 2 and the drive unit 3 combined to form an installation module 7 which can be fitted and removed as a unit. In consequence, the majority of the internal wiring of the installation module 7 may be permanently connected in advance. Both the wiring complexity for connecting the installation module 7 and the risk of incorrect wiring are thus considerably reduced.

The actuator unit A has a safe output channel 8 via which the emergency disconnection signal can be passed from the drive unit 3 to a further actuating unit B, which is illustrated schematically in FIG. 1.

The design and method of operation of the actuator unit B correspond essentially to those of the actuator unit A. In particular, the actuator unit B can also be supplied, via an input channel 10, with a drive signal for a three-phase circuit 11. The three-phase circuit 11 may also have a rated voltage U of up to 1 kV. Thus, in particular, the rated voltage of the three-phase circuit 11 can also be 380 V or more here.

The drive signal for the three-phase circuit 11 may be different from the drive signal for the three-phase circuit 4. Furthermore, the further actuator unit B also has a safe output channel 12 via which the emergency disconnection signal can be passed from the further actuator unit B to a further actuator unit, which is not actually shown in FIG. 1.

In contrast to the actuator unit A, the actuator unit B has only a single safe disconnection channel 13, however. This is also sufficient for the actuator unit B, since there is no need for it to monitor a number of safe disconnection channels. This is because this task is carried out by the actuator unit A. The actuator unit B just has to be able to react to an emergency disconnection signal which is passed on from the actuator unit A.

The provision of only a single safe disconnection channel 13 for the actuator unit B also reduces the wiring complexity. This is because a safe disconnection channel 5 need in each case have six connections for connecting only a single emergency signal release 9 to the actuator unit A. However, to pass on an emergency disconnection signal from the actuator unit A to the actuator unit B, the safe output channel 8 of the actuator unit A and the safe disconnection channel 13 of the actuator unit B need each have only two connections, however.

Figure 2:
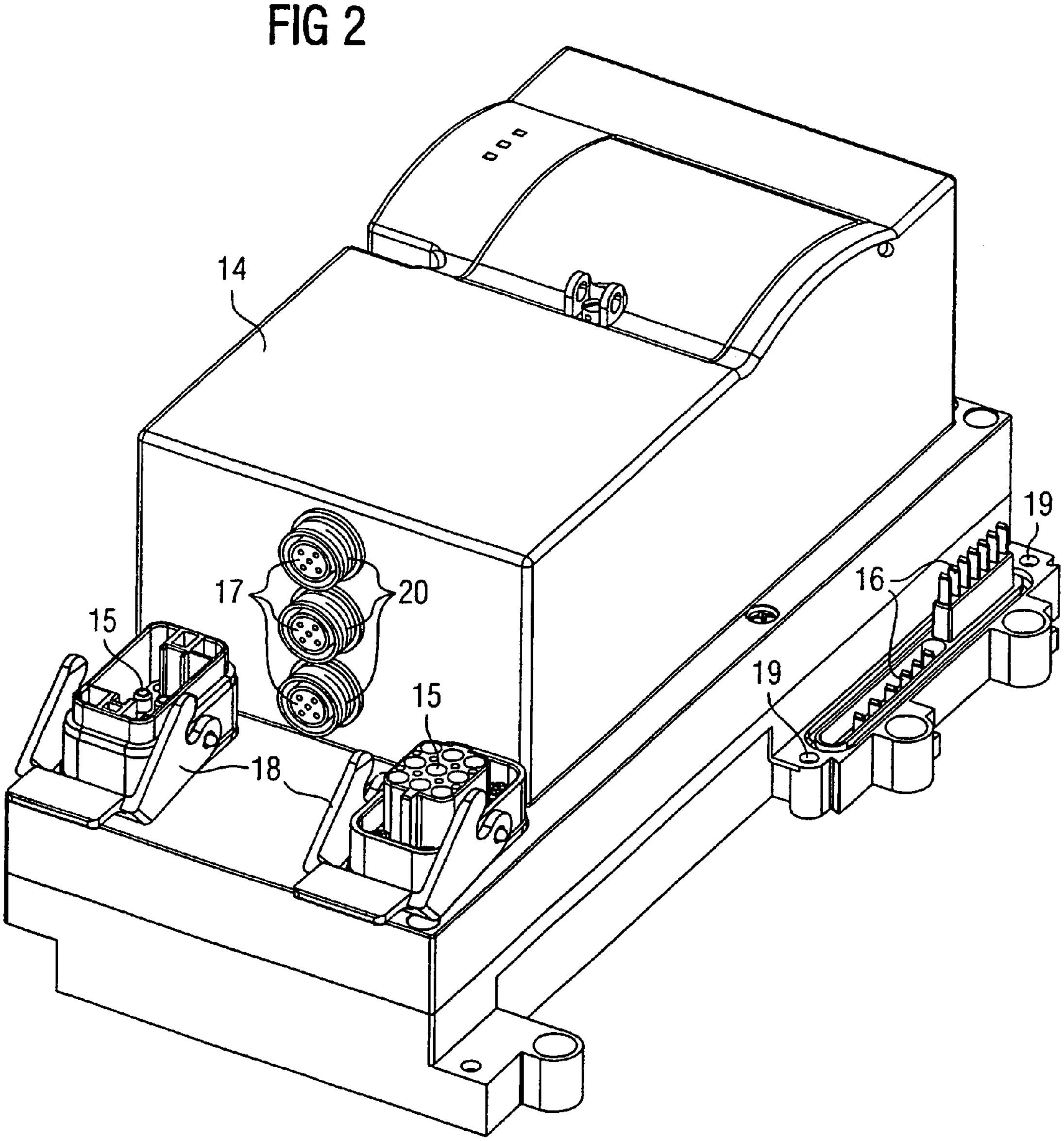

FIG. 2 now shows the mechanical/design configuration of the actuator unit A from FIG. 1.

FIG. 2 shows the contactors 1, 2 and the drive unit 3 arranged in a housing 14. The housing 14 is in the form of a housing 14 to a high degree of ingress protection, via which the contactors 1, 2 and the drive unit 3 are encapsulated from the environment. "High degree of ingress protection" in this case indicates protection to at least ingress protection IP 54, preferably to ingress protection IP 65, or even to ingress protection IP 67.

FIG. 2 shows the actuator unit A with plug connectors 15 to 17. The plug connectors 15 to 17 are accessible from outside the housing 14. The contactors 1, 2 can be connected to the three-phase circuit 4 by the plug connectors 15. Electrical power can be supplied to the contactors 1, 2 and to the drive unit 3 by use of the plug connector 16. Further signals, for example emergency stop signals and normal control signals, can be supplied to the drive unit 3 by the plug connectors 17. Furthermore, signals can be transmitted to the actuator unit B via the plug connectors 17.

The plug connectors 15 have associated interlocking levers 18. The plug connector 16 has associated threaded holes 19. The plug connectors 17 are provided with screw threads 20. The interlocking levers 18, the threaded holes 19 and the screw threads 20 form holding apparatuses 18 to 20, by which mating plug connectors, which are not shown but are connected to the plug connectors 15 to 17, and/or covers, which are not shown but are fitted to the plug connectors 15 to 17, can be secured against accidentally becoming loose.

The provision of the housing 14 with the plug connectors 15 to 17 and the association of the holding apparatuses 18 to 20 with the plug connectors 15 to 17 is feasible, of course, irrespective of the presence of the housing 14, and whether the housing 14 is configured as a housing 14 to a high degree of ingress protection.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An actuator unit comprising:

at least two contactors, adapted to open and close a three-phase circuit, the three-phase circuit being adapted to be opened as soon as at least one of the contactors is deactivated; and a drive unit, adapted to be supplied, by at least one safe disconnection channel, with an emergency disconnection signal for the three-phase circuit, on the basis of which the drive unit is adapted to open the three-phase circuit by driving at least one of the contactors, wherein the contactors and the drive unit are combined to form an installation module which is removable as a unit, wherein the emergency disconnection signal is passed on from the drive unit via a safe output channel to a further actuator unit, the safe output channel having fewer connections than the at least one safe disconnection channel.

2. The actuator unit as claimed in claim 1, wherein the drive unit is adapted to be supplied via an input channel with a drive signal for the three-phase circuit, on the basis of which the drive unit is adapted to open or close the three-phase circuit, depending on the drive signal, if the emergency disconnection signal is not present.

3. The actuator unit as claimed in claim 1, wherein the drive unit always deactivates all the contactors in order to open the three-phase circuit.

4. The actuator unit as claimed in claim 1, wherein the contactors and the drive unit are separated from an environment by encapsulation in a housing with a high degree of ingress protection.

5. The actuator unit as claimed in claim 4, wherein the actuator unit further comprises:

plug connectors for connecting the contactors to the three-phase circuit.

6. The actuator unit as claimed in claim 5, wherein the plug connectors are accessible from outside the housing.

7. The actuator unit as claim in claim 6, wherein the plug connectors include holding apparatuses for securing mating plug connectors which are connected to the plug connectors.

8. The actuator unit as claim in claim 5, wherein that the plug connectors include holding apparatuses for securing mating plug connectors which are connected to the plug connectors.

9. The actuator unit as claimed in claim 1, wherein the three-phase circuit includes a rated voltage of at least 380 V.

10. The actuator unit as claimed in claim 1, wherein the actuator unit further comprises:

plug connectors for connecting the contactors to the three-phase circuit.

11. The actuator unit of claim 1, wherein the at least one safe disconnection channel includes six connections and the safe output channel includes two connections.

12. A method of operating an actuator unit including at least two contactors, adapted to open and close a three-phase circuit, the three-phase circuit being adapted to be opened as soon as at least one of the contactors is deactivated, and a drive unit, the method comprising supplying the drive unit, by at least one safe disconnection channel, with an emergency disconnection signal for the three-phase circuit;

opening the three-phase circuit via the drive unit, by driving at least one of the contactors, wherein the contactors and the drive unit are combined to form an installation module which is removable as a unit; and passing the emergency disconnection signal from the drive unit via a safe output channel to a further actuator unit, the safe output channel having fewer connections than the at least one safe disconnection channel.

13. A system comprising:

a first actuator unit including first actuator contactors configured to open and close a first actuator three-phase circuit, the first actuator three-phase circuit configured to be opened as soon as at least one of the first actuator contactors is deactivated; and a first actuator drive unit connected to a plurality of safe disconnection channels for receiving an emergency disconnection signal, the drive unit opens the first actuator three-phase circuit by driving at least one of the first actuator contactors based on a received emergency disconnection signal; and a second actuator including second actuator contactors configured to open and close a second actuator three-phase circuit, the second actuator three-phase circuit configured to be opened as soon as at least one of the second actuator contactors is deactivated; and a second actuator drive unit connected to the first actuator unit via a safe output channel and configured to receive the emergency disconnection signal from the first actuator unit via the safe output channel, the second actuator drive unit opens the second actuator three-phase circuit by driving at least one of the second actuator contactors based on the emergency disconnection signal received from the first actuator, wherein the safe output channel has fewer connections than each of the plurality of safe disconnection channels.

* * * * *